(12) United States Patent
Calais et al.

(10) Patent No.: US 6,863,248 B2
(45) Date of Patent: Mar. 8, 2005

(54) PIPE SUPPORT APPARATUS

(75) Inventors: Chad Anthony Calais, Breaux Bridge, LA (US); Lucas Johnson, Lafayette, LA (US)

(73) Assignee: Advance Products and Systems, Inc., Scott, LA (US)

( * ) Notice: Subject to any disclaimer, the term of this patent is extended or adjusted under 35 U.S.C. 154(b) by 0 days.

(21) Appl. No.: 10/284,804

(22) Filed: Oct. 30, 2002

(65) Prior Publication Data

US 2004/0084572 A1 May 6, 2004

(51) Int. Cl.[7] ............................................... F16L 3/00
(52) U.S. Cl. .......................... 248/49; 285/61; 248/70
(58) Field of Search ................ 285/61, 64; 248/49, 248/65, 67.7, 70, 228.4, 218.4, 227.3, 230.1, 230.5

(56) References Cited

U.S. PATENT DOCUMENTS

| | | | | |
|---|---|---|---|---|
| 3,944,175 A | * | 3/1976 | Kearney | 248/59 |
| 4,428,893 A | | 1/1984 | Cummings, Jr. | |
| 4,610,362 A | * | 9/1986 | Remp et al. | 211/59.4 |
| 5,042,282 A | * | 8/1991 | Kimura | 72/217 |
| 5,069,234 A | * | 12/1991 | Nielsen | 134/113 |
| 5,123,547 A | * | 6/1992 | Koch | 211/59.4 |
| 5,335,887 A | | 8/1994 | Torrens | |
| 5,556,062 A | | 9/1996 | Ellett | |
| 5,615,696 A | * | 4/1997 | Lawler | 134/104.2 |
| 5,893,542 A | * | 4/1999 | Hu | 248/176.1 |
| 6,224,024 B1 | * | 5/2001 | Fritz | 248/55 |
| 6,283,425 B1 | * | 9/2001 | Liljevik | 248/230.4 |
| 6,502,791 B2 | * | 1/2003 | Parker | 248/70 |

OTHER PUBLICATIONS

Reynolds French & Company, Tulsa Pipe Supports, Aug. 19, 1999, Tulsa OK, 2 pages.
Reynolds French & Company, Tulsa Pipe Supports, Aug. 11, 2001, 4 pages, Tulsa, OK.
Code of Federal Regulations, U.S. Government, Title 49–Transportation, Title 49, vol. 3, Oct. 1, 2001, 3 pages.

* cited by examiner

Primary Examiner—Leslie A. Braun
Assistant Examiner—A. Joseph Wujciak
(74) Attorney, Agent, or Firm—William W. Stagg

(57) ABSTRACT

A pipeline support for supporting a pipeline along its longitudinal axis comprised of a first and second longitudinally extending cylindrical supports supported on transversely extending threaded rods. The first support is fixed at one end of the transversely extending rods and the second support is movable along the rods, toward and away from the first support, so that the contact surface between the pipeline surface and the support surface may be moved and adjusted to inspect for corrosion or other defects. The pipeline support is designed so that the space between the first and second supports may be adjusted from one side of the pipeline only.

13 Claims, 13 Drawing Sheets

PIPE SUPPORT APPARATUS

FIELD OF THE INVENTION

This invention relates to pipeline supports and more particularly to an improved pipe support that allows the interface between the pipe support and pipeline to be changed to facilitate inspection and maintenance of the pipeline and pipe support.

BACKGROUND OF THE INVENTION

Internal and external forces on piping systems caused by such things as variations in temperature and flow dynamics may cause displacement of a pipeline in its longitudinal axis. Bearing blocks are used to support the piping systems and to provide a means to allow for unrestricted movement during displacement, expansion or contraction of the pipeline in order to reduce stress in the pipeline and its supports. Corrosion, dirt and other contaminates can affect the performance of the bearing blocks and damage or weaken the piping system. Consequently, these pipe supports and piping system must be periodically inspected and if need be maintained in order to continue their effectiveness.

SUMMARY OF THE INVENTION

Applicants' present an improved pipe support apparatus and method to facilitate the inspection and maintenance of pipeline piping systems that include pipe supports and piping. Applicants' pipe support apparatus is comprised of first and second cylindrical support members supported in a parallel position on a plurality of threaded support stringers by means of transverse stringer holes bored through each of the cylindrical support members. The first cylindrical support member is fixed to the threaded stringer. The second cylindrical support member may be moved to a desired position along the stringer by means of a threaded nut or threaded nut and washer combination. The cylindrical support members may be constructed of synthetic composite members to guard against corrosion though other materials might be utilized such as stainless steel.

A pipeline is supported by applicants' pipe support apparatus by means of placing the first and second cylindrical support members beneath the pipeline so that they extend parallel to the longitudinal axis of the pipeline. The support interface between each of the cylindrical support members may be adjusted to a desired location by sliding the second cylindrical support toward or away from the first support member along the transversely positioned stringers. Because the support interface may be changed, the original interface point on the pipeline and on the support may be inspected for corrosion or other contamination as need to assure proper pipeline maintenance. The cylindrical shape of the first and second supports also minimizes the contact area between the supports and the pipeline and thus the points of potential corrosion. A positioning tool having an elongated driving socket head is provided to assist in the positioning of the second cylindrical along the stringer. The configuration of the cylindrical supports, one fixed and one movable on opposite sides of the pipeline, allows the pipe support to be adjusted from only one side and with a minimum of effort.

DESCRIPTION OF THE PREFERRED EMBODIMENTS

Figure 1:
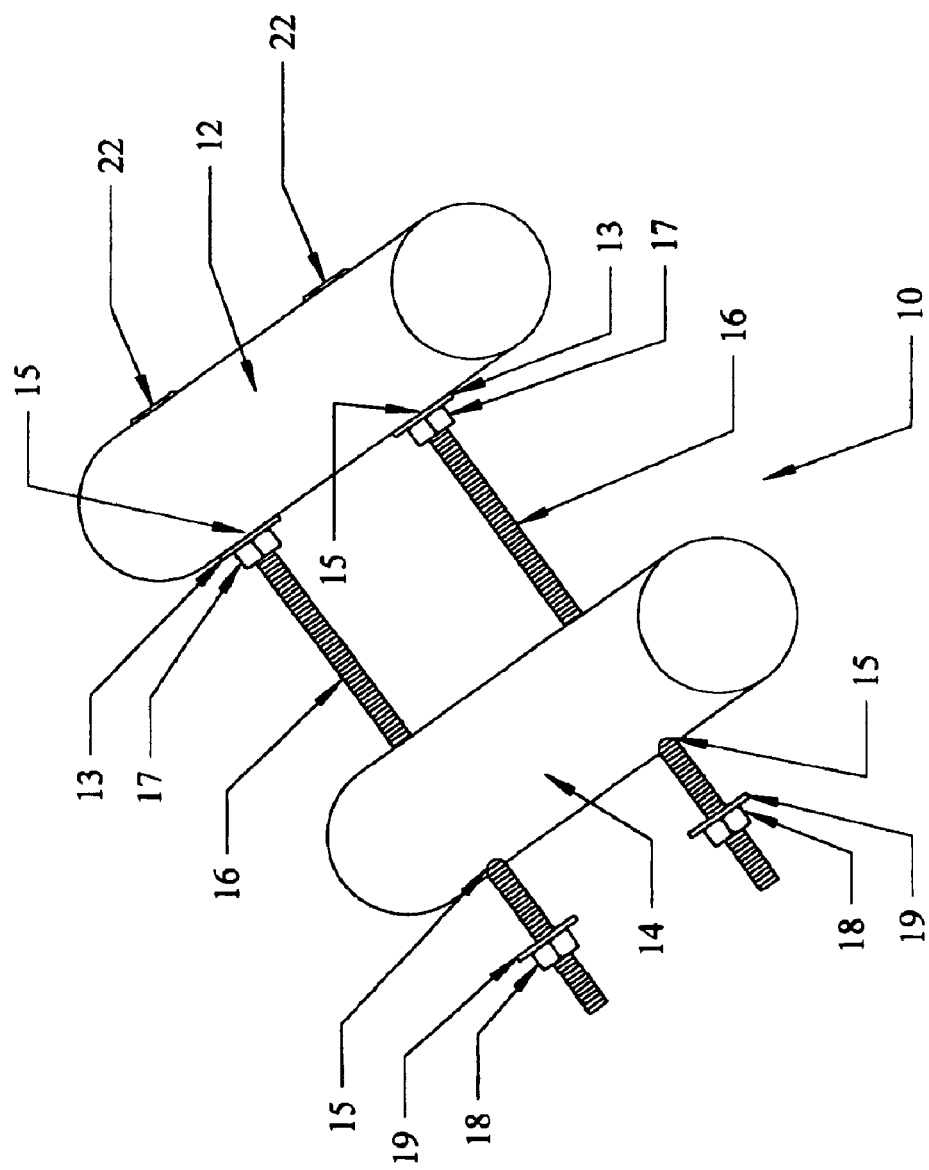
FIG. 1 is a perspective view of the pipe support of applicants' present design.

FIG. 1 shows a perspective view of the pipe support (10) of Applicants' present design. The pipe support (10) is comprised of a first cylindrical pipe support (12) and a second cylindrical pipe support (14). Each cylindrical support (12, 14) has a plurality of bore holes (15) positioned at desired locations transverse to the longitudinal axis of each support (12, 14). The first support (12) is fixedly positioned at one end of a plurality of threaded rods or stringers (16), each stringer (16) running through a selected bore hole (15) in the support (12). The free or opposite end of each stringer (16) extends through a selected transverse bore hole (15) of the second cylindrical support (14) so as to place the second cylindrical support (14) in a position parallel to the first cylindrical support (12) on the stringers (16). A stringer nut (18) and washer (19) are threaded onto each stringer (16) to secure the second cylindrical support onto the stringers (16).

The cylindrical supports (12, 14) may be formed from synthetic materials, or a combination of such materials, such as virgin resins, polyolefins and plastics, as well as other elastomers to guard against corrosion. However, the supports (12, 14) may also be formed from cast metals or metal alloys such as stainless steel without departing from the scope of applicants' invention.

Figure 2:
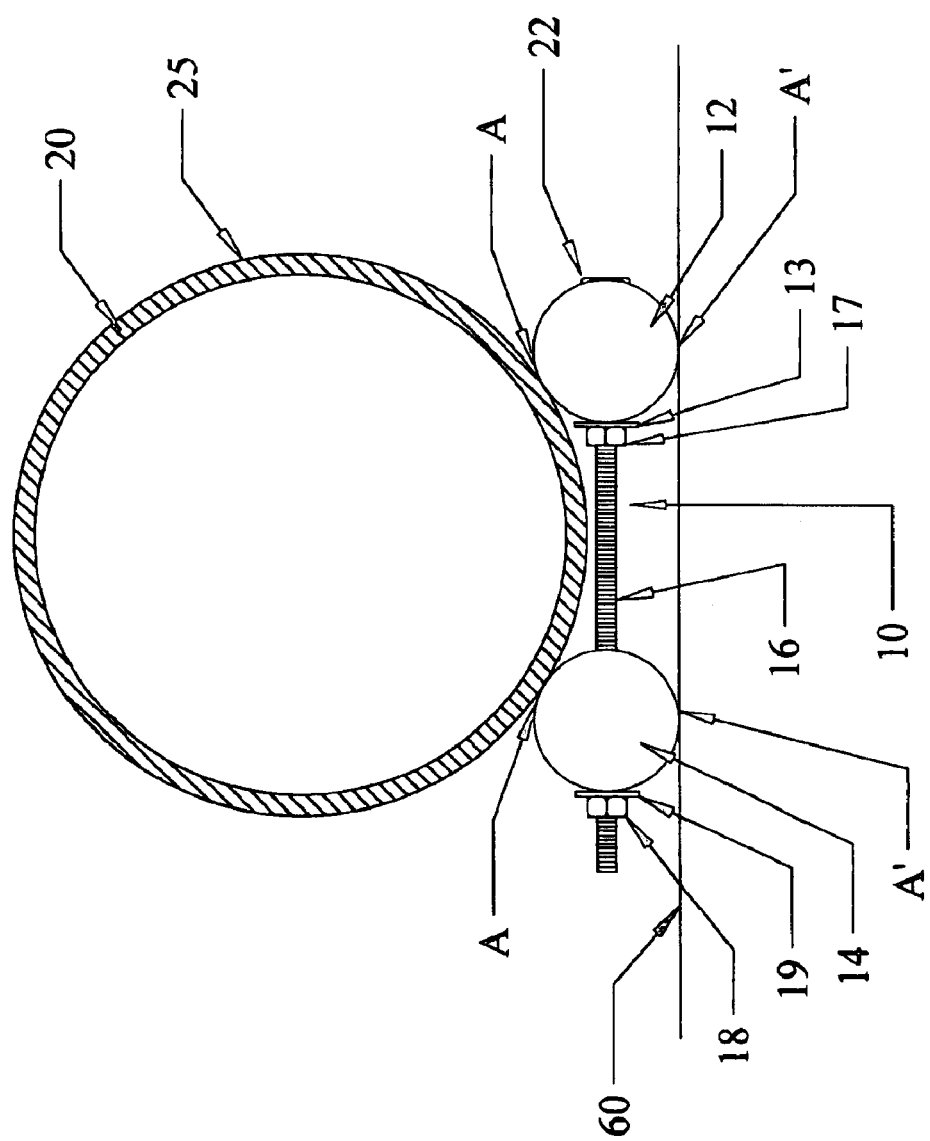
FIG. 2 is an end view of the pipe support of FIG. 1 shown in position under a pipeline.

Referring now to FIG. 2, there is shown the pipe support (10) of applicants' design positioned on a pad (60) for support of a pipeline (20). As can be seen, each cylindrical support (12, 14) has an interface point (A) with the outer periphery (25) of the pipeline (20). The first cylindrical support (12) is fixedly positioned to at one end of each stringer (16). The second cylindrical support (14) is slideably positioned on the stringers (16) by means of its bore hole (15) and the threadably positionable nut (18) and washer (19) combination. Turning of the threadably positionable nut (18) positions the nut (18) and washer (19) combination against the second cylindrical support (14) and moves it toward the first cylindrical support (12). When the second cylindrical support (14) is so moved, the interface (A) between the pipeline outer surface (25) and the supports (12, 14) is changed. Similarly, movement of the second cylindrical support (14) changes the interface (A') between the supports (12, 14) and the support base (60).

Because the nut (18) is on the outside longitudinal side of the pipeline (20) and pipe support (10), the nut (18) allows the supports (12, 14) to be adjusted to a desired position in relation to the pipeline (20) by an operator without the operator having to adjust bolts or other fastening means located underneath the pipeline (20) or between the first and second cylindrical supports (12, 14). The outside adjusting nut (18) facilitates easy adjustment of the position of the cylindrical supports (12, 14) and allows for ready inspection of the interface area between the pipeline (20) and pipe supports (12, 14) to check for corrosion or damage to the pipeline or the supports.

The cylindrical shape of the supports (12, 14) also serves to reduce the contact surface area interface (A) between the supports (12, 14), the pipeline (20) and the contact surface area interface (A') between the supports (12, 14) and the support pad (60). This reduction of contact surface area helps to reduce the incidence of corrosion and the collection of debris at the pipeline—pipe support interface.

Figure 3:
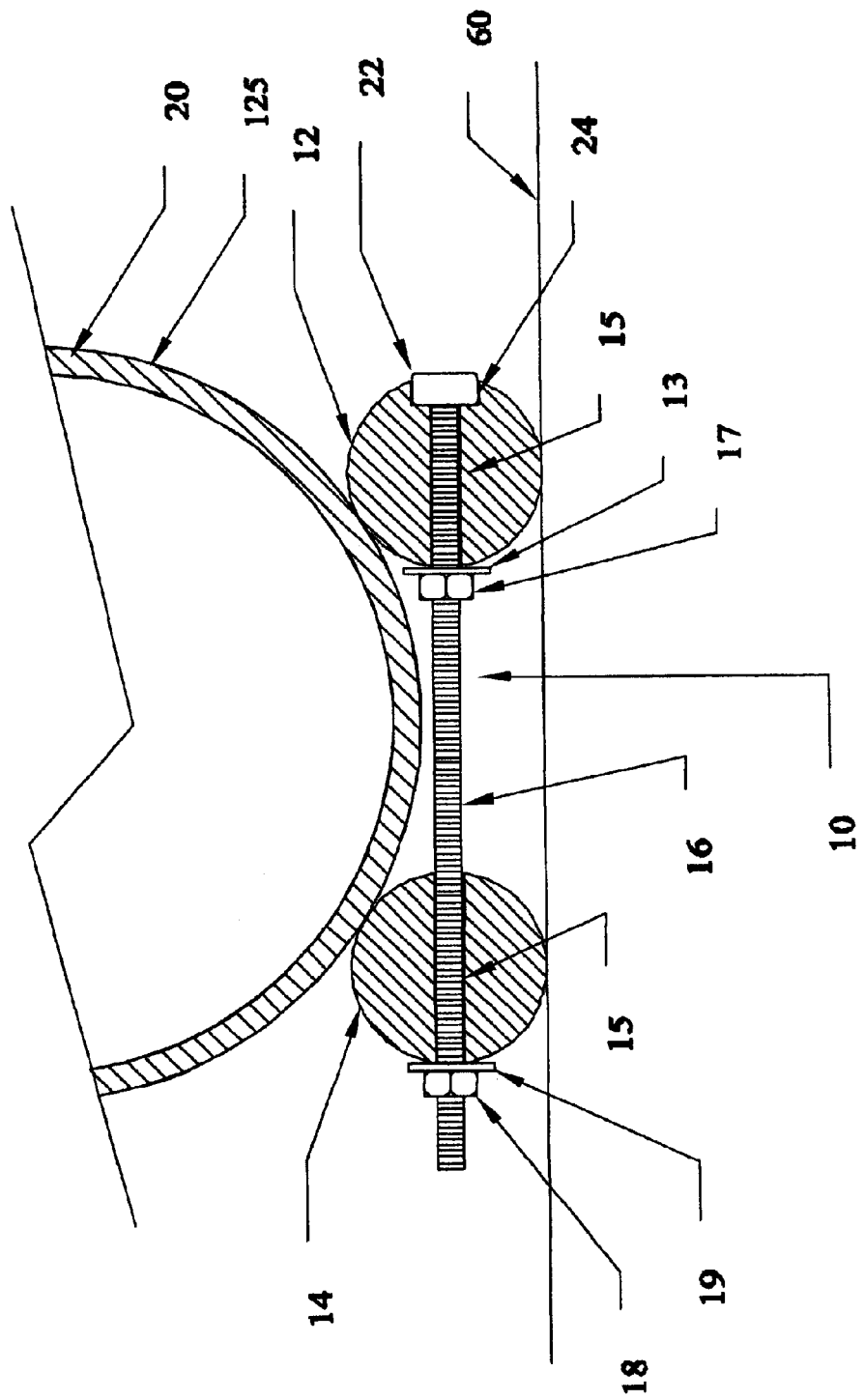
FIG. 3 is a longitudinal cross-sectional view of the pipe support of FIG. 1 cut through the stringer bore hole of each support cylinder.

FIG. 3 shows a cross-sectional view of applicants' pipe support (10) cut through a bore hole (15) of each support (12, 14). As can be seen, the first cylindrical support (12) has a recessed area (24) for receiving the head of a nut (22) fixedly mounted at the end of the threaded stringer (16). The recessed area (24) is configured to hold the nut (22) in place to prevent its rotation and consequently the rotation of the stringer (16). A nut (17) with washer (13) placed on each stringer (16) holds the first support (12) in place against the nut (22).

The second cylindrical support (14) is positioned on the stringer (16) by means of the bore holes (15) in a position parallel to the first cylindrical support (12). The opposite end of each stringer (16) is provided with a nut (18) and washer (19) that are threadably movable along the stringer (16). Movement of the nut (18) and washer (19) combination toward and away from the support (12) will position the supports (12, 14) at a desired position with respect to the pipeline (20). With the first cylindrical support (12) in a fixed position on the stringers (16), each nut (18) and washer (19) combination can be threadably positioned against the second cylindrical support (14) to move the support (14) along the stringers (16) and thereby raise and lower the pipeline (20) to change the area of support interface (A) between the pipeline (20) and the supports (12, 14).

Figure 4:
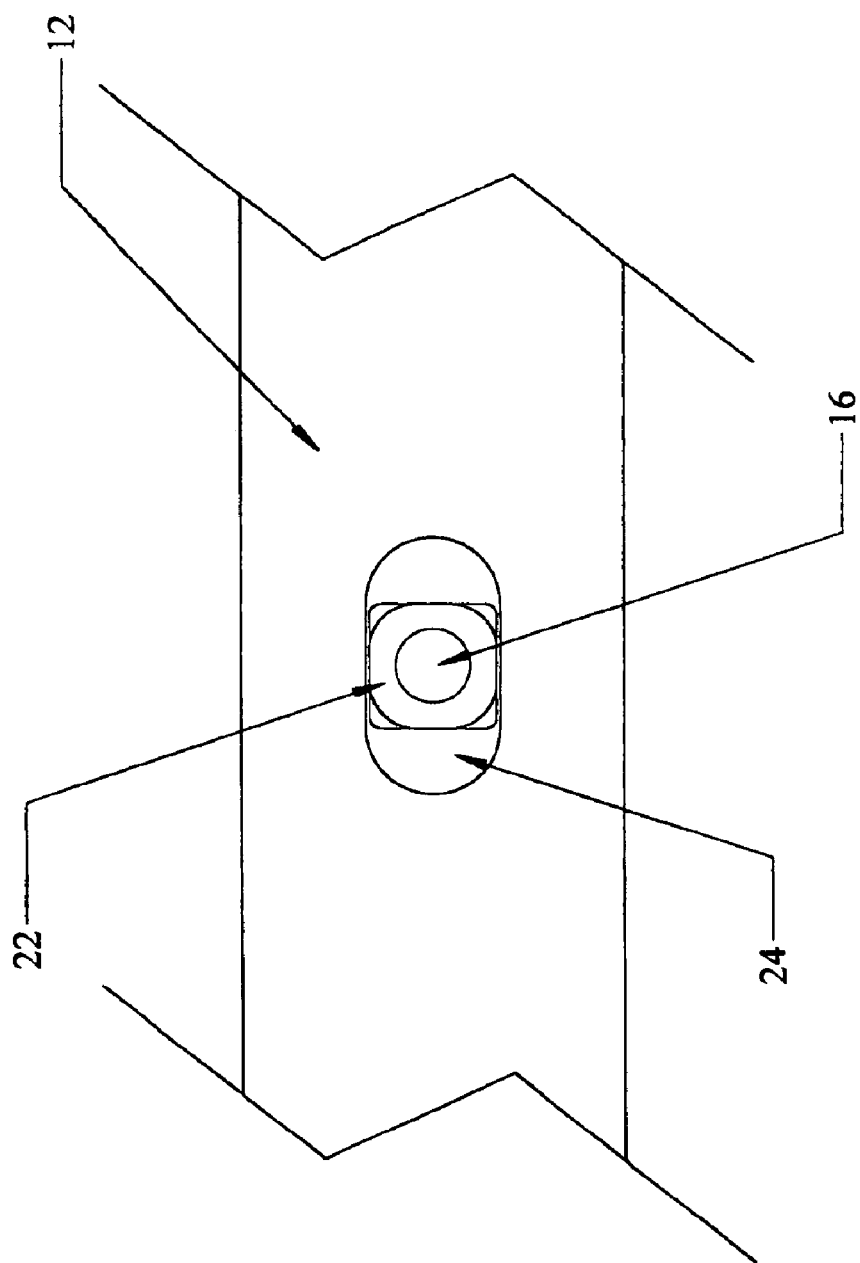
FIG. 4 is a side view of the first support cylinder of the pipe support of FIG. 1 shown at the stringer end.

FIG. 4 is a partial side view of the first cylindrical support (12) at the location of a bore hole (15). The recessed area (24) is positioned in side of the support (12) to receive and hold the nut (22) mounted to the stringer (16) and to prevent its rotation.

Figure 5:
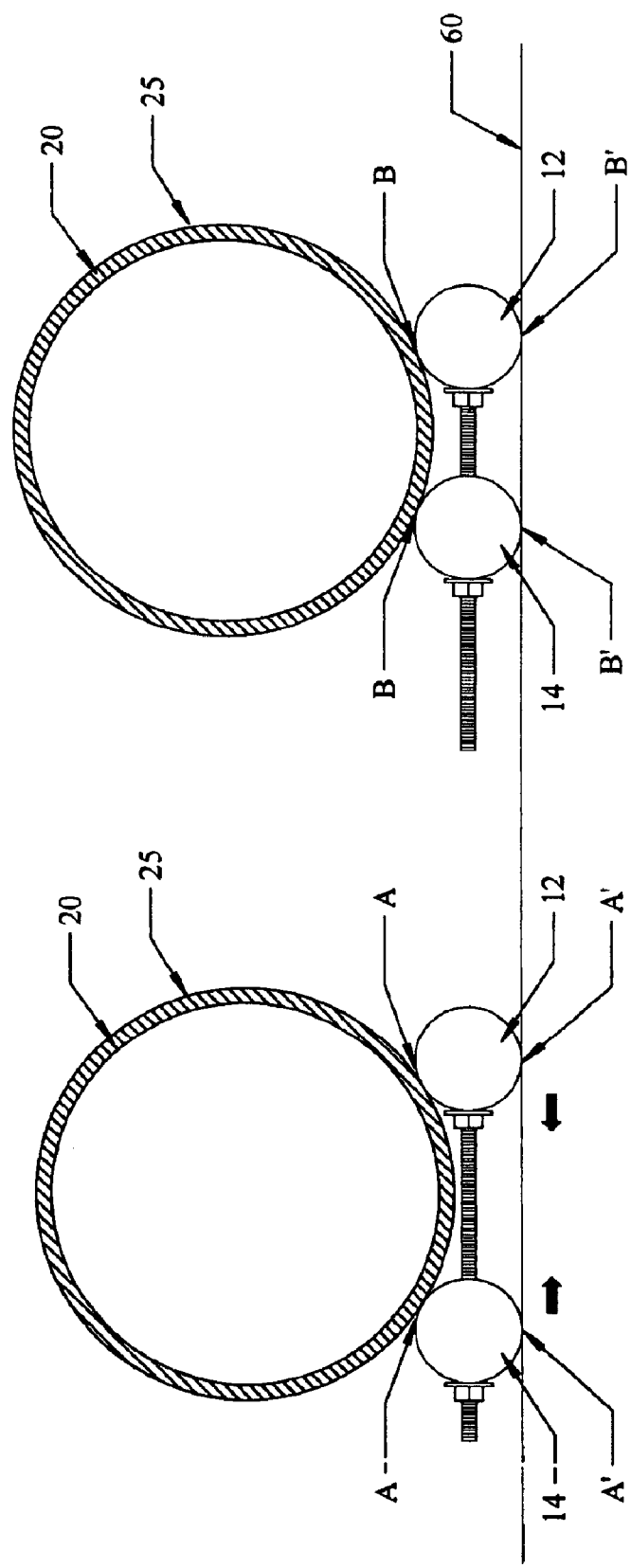
FIG. 5 is a diagrammatic view of a pipeline having a pipe support of applicants' configuration illustrating an adjustment in the pipeline—pipe support interface.

FIG. 5 is a diagrammatic view of a pipeline (20) having applicants' pipe support (10) illustrating an adjustment in the vertical position of the pipeline and the interface between the pipeline (20) and pipe supports (12, 14). Movement of the nut (18) and washer (19) combination against the second cylindrical support (14), toward and away from the support (12), will position the interface point (A) between the supports (12, 14) and periphery (25) of the pipeline (20) at desired position. Additional movement of the support (14) toward the support (12) will raise the pipeline (20) and change the interface point between the supports (12, 14) and the pipeline (20) from a desired point (A) to a desired point (B), as shown, and will allow for the inspection of the wall of the pipeline (20) and the supports (12, 14) at desired locations. Similarly, movement of the second cylindrical support (14) changes the interface (A') between the supports (12, 14) and the support base (60) to a desired point (B') as shown.

Figure 6:
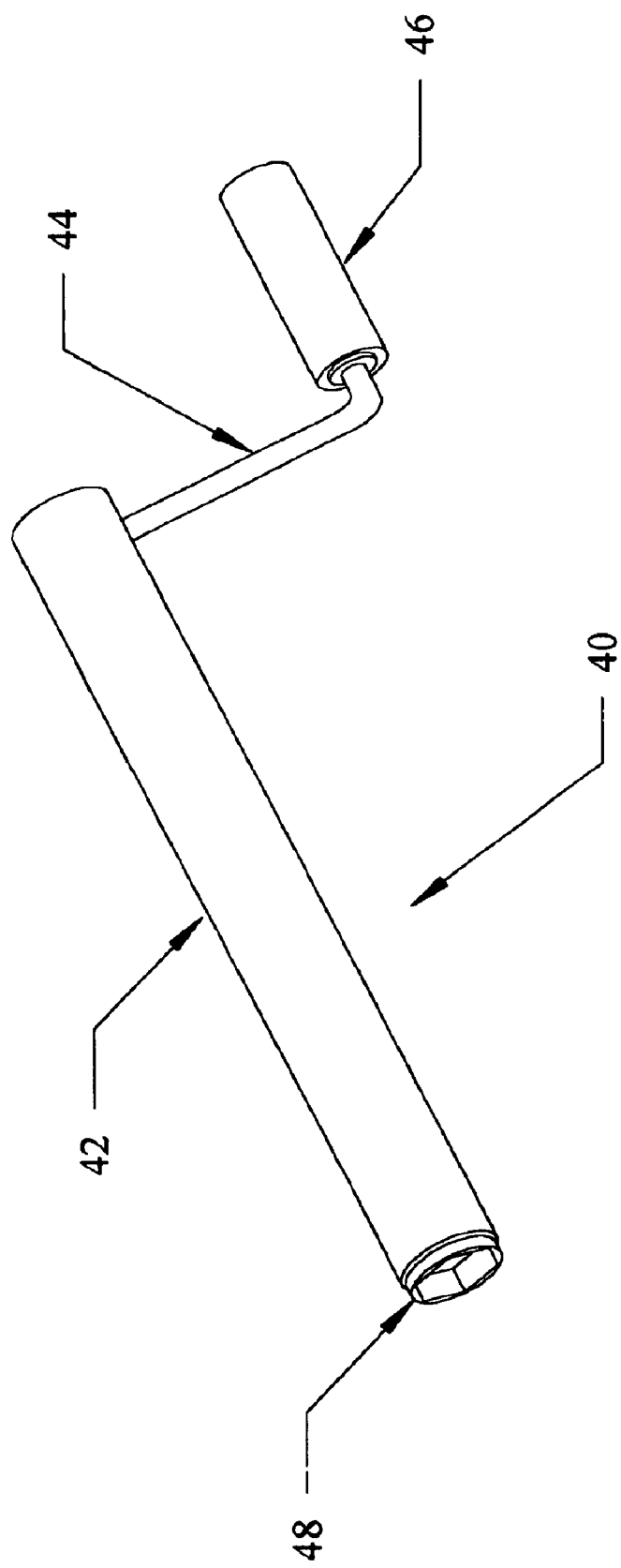
FIG. 6 is a perspective view of the cylinder spacing adjustment tool for use with pipe supports of applicants' configuration.

Movement of the nut (18) and washer (19) combination will provide movement of the cylindrical support (14) toward and away from the cylindrical support (12). The nut (18) can be manipulated with a wrench or wrench and socket combination. Because the space around and under the pipeline (20) may be cramped, a detachable wrench (40) having an elongated cylindrical socket (42) with a head (48) conforming to the dimensions of the nuts (18) may be utilized to move the supports such as that depicted in FIG. 6 may be useful. The wrench (40) has a crank (44) extending particularly from the socket (48) and handle (46) to facilitate rotation of the socket (42). The wrench (40) will facilitate adjustment of the position of the nut (18) and washer (19) combination, and consequently the support (14), from the outside longitudinal side of the support (14).

Figure 7:
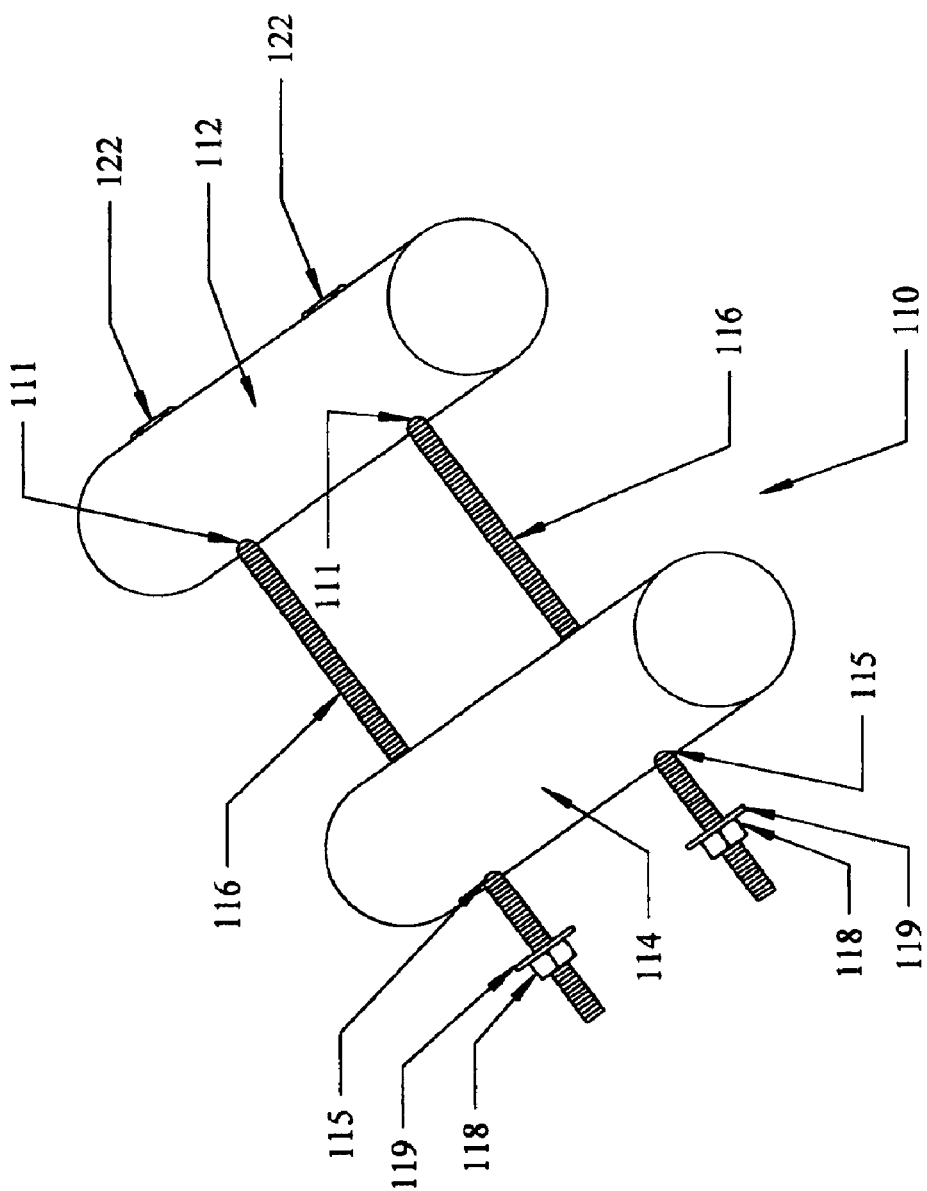
FIG. 7 is a perspective view of an alternate embodiment of applicants' pipe support showing the stringers fixed to first support cylinder with an epoxy or other gluing means.

FIG. 7 presents a perspective view of an alternate embodiment (110) of applicants' pipe support. The pipe support (110) is comprised of a first cylindrical pipe support (112) and a second cylindrical pipe support (114). Each cylindrical support (112, 114) has a plurality of bore holes (115) positioned at desired locations transverse to the longitudinal axis of each cylindrical support (112, 114).

The first cylindrical support (112) is fixedly positioned at one end of a plurality of threaded rods or stringers (116) by means of an epoxy resin (111) or other gluing means within each bore hole (115) of the first cylindrical support (112) so that each stringer (116) runs through and is fixed in a selected bore hole (115) in the support (112). The free or opposite end of each stringer (116) extends through a selected transverse bore hole (115) of the second cylindrical support (114) so as to place the second cylindrical support (114) in a position parallel to the first cylindrical support (112) on the stringers (116).

Figure 8:
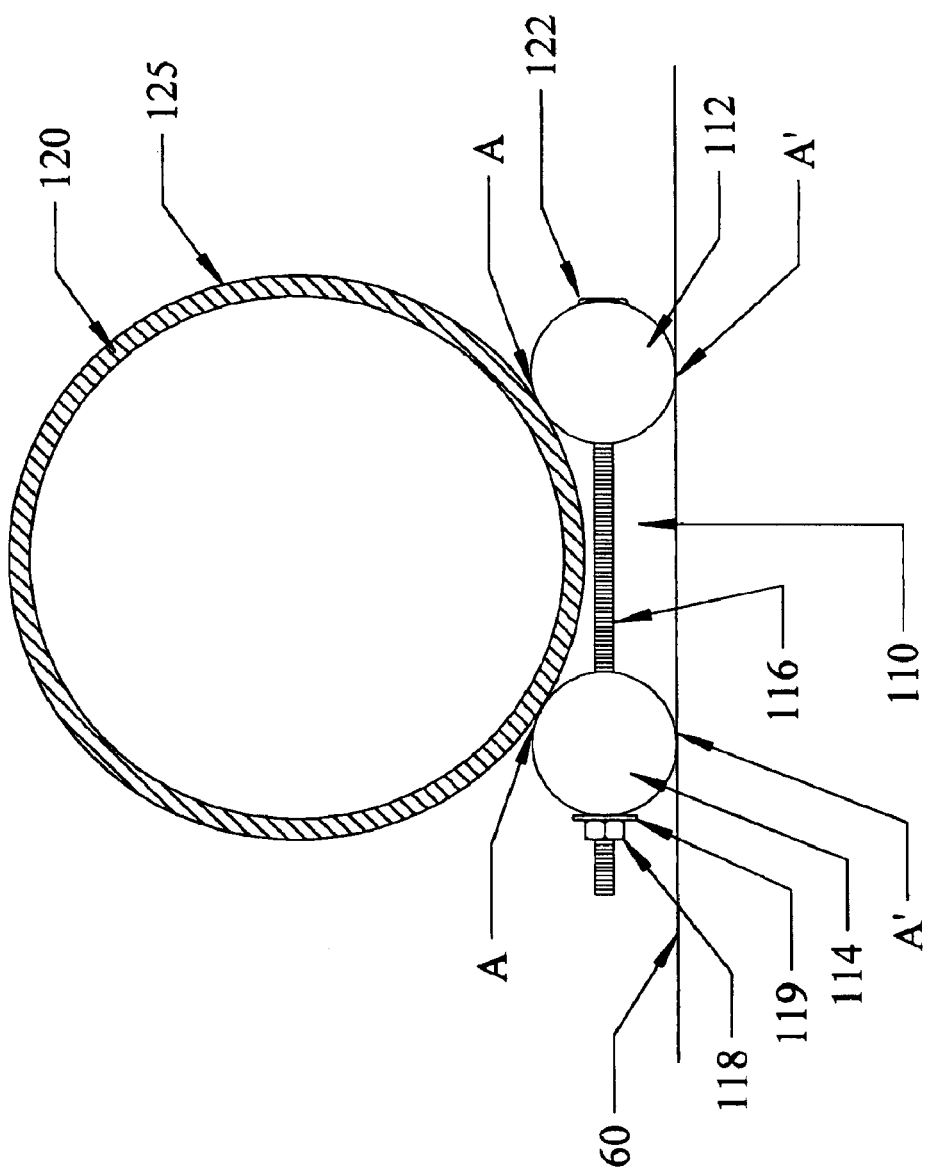
FIG. 8 is an end view of the pipe support of FIG. 7 shown in position under a pipeline.

As shown in FIG. 8, an end view of the pipe support (110), a stringer nut (118) and washer (119) are threaded onto each stringer (116) to secure the second cylindrical support onto the stringers (116). The nuts (118) and washers (119) are threadably movable along the stringer (116) by manipulation from the outside longitudinal side of the pipeline (120) and the second cylindrical support (114). Because there is no intervening stop or bolting mechanism on the inside longitudinal surface of the second cylindrical support (114), the second cylindrical support (114) is slideably positionable at a desired location with respect to the first cylindrical support (112). Movement of the nut (118) and washer (119) combination toward and away from the support (112) will position the supports (112, 114) at a desired position (A) with respect to the outer surface (125) of the pipeline (120).

Figure 9:
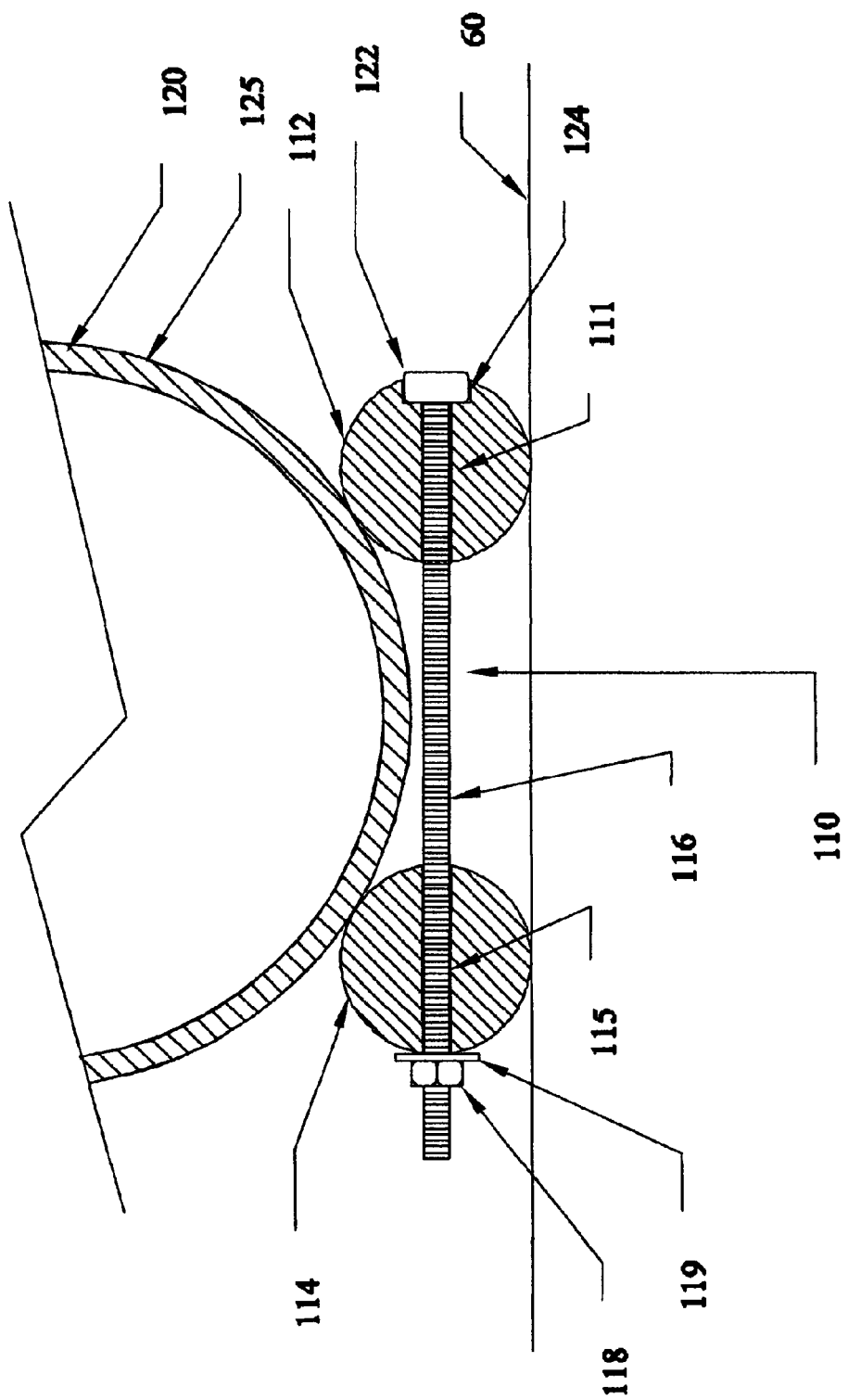
FIG. 9 is a longitudinal cross-sectional view of the pipe support of FIG. 7 cut through the stringer bore hole of each support cylinder.
Figure 10:
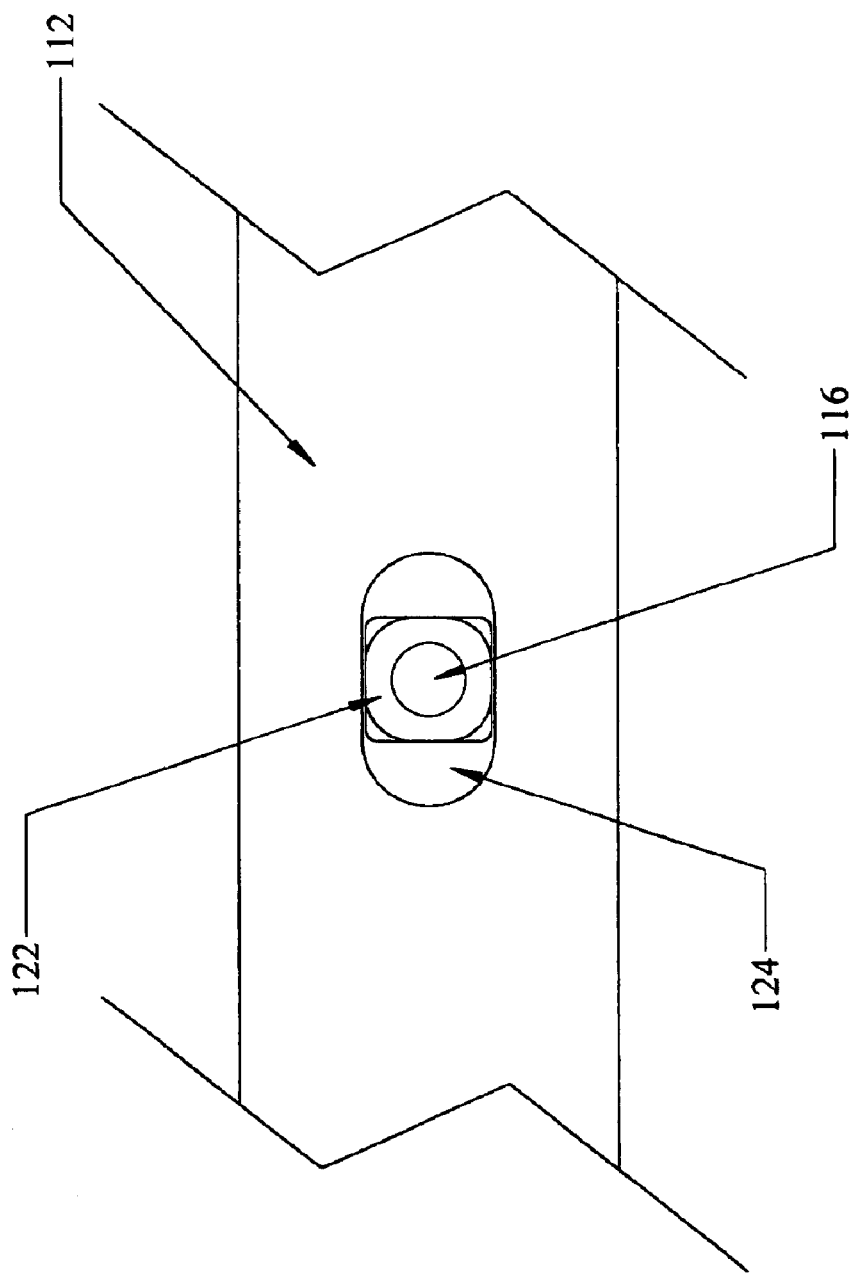
FIG. 10 is a side view of the first support cylinder of the pipe support of FIG. 7 shown at the stringer end.

FIG. 9 is a longitudinal cross-sectional view of the pipe support (110) cut through the stringer bore hole (115) of each support cylindrical support (112, 114). The stringer (116) is fixedly mounted in the bore hole (115) of the first cylindrical support (112) by means of an epoxy resin filler (111) or other gluing means. As shown in FIGS. 9 and 10, a partial side view of the first cylindrical support (112), each threaded stringer (116) has a nut (122) fixedly mounted in the recessed area (124) in the side of the support (112). The combination of the nut (122), recess (124) and epoxy filler (111) holds the stringer in place in the support (112).

FIG. 10 is a partial side view of the first cylindrical support (112) at the location of a bore hole (115). The recessed area (124) is positioned in side of the support (112) to receive and hold the nut (122) mounted to the stringer (116) and to prevent its rotation.

Figure 11:
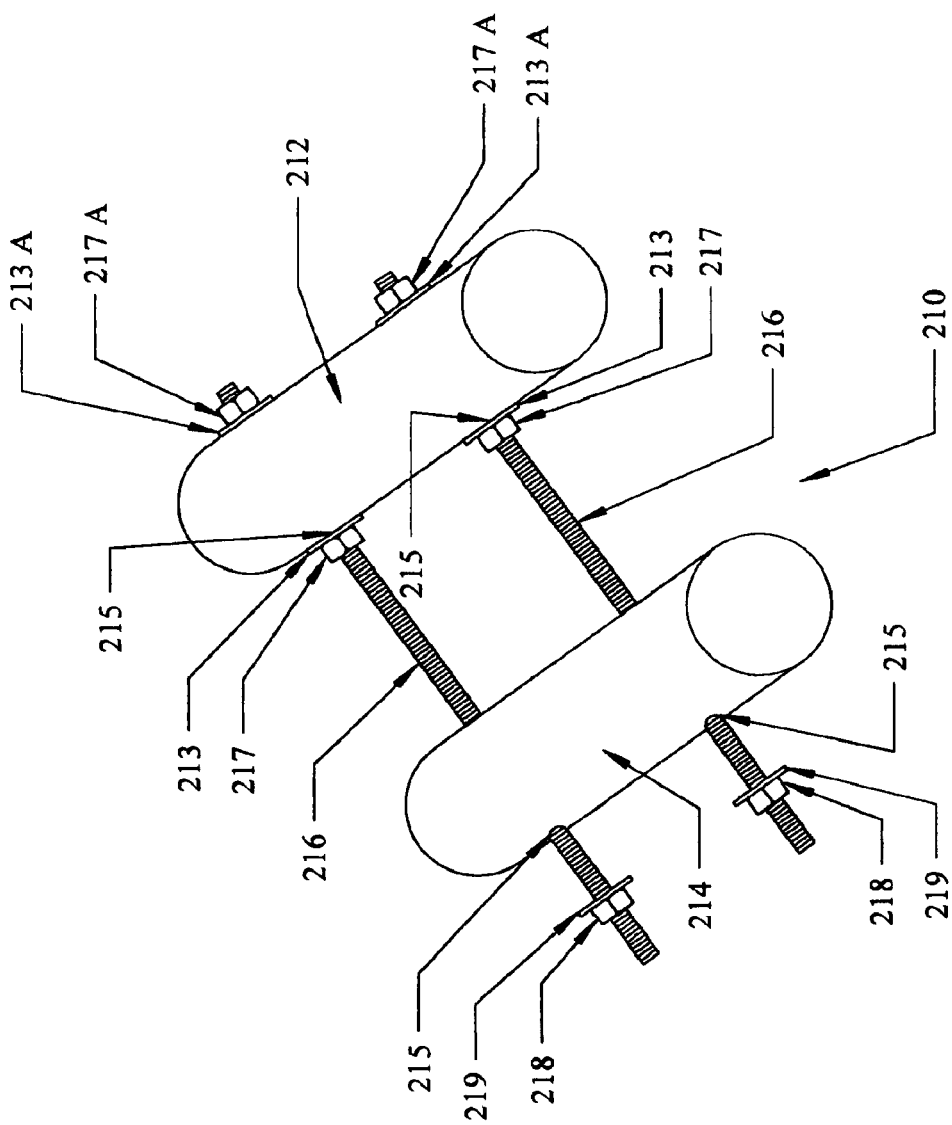
FIG. 11 is a perspective view of another alternate embodiment of applicants' pipe support showing the stringers fixed to first support cylinder by bolts.

FIG. 11 presents a perspective view of another alternate embodiment of applicants' pipe support designated as (210). As in the above noted embodiments, the pipe support (210) is comprised of a first cylindrical pipe support (212) and a second cylindrical pipe support (214). Each cylindrical support (212, 214) has a plurality of bore holes (215) positioned at desired locations transverse to its longitudinal axis. The first cylindrical support (212) is fixedly positioned at one end of a plurality of threaded rods or stringers (216) by means of the opposing nut and washer combinations, nut (217) and washer (213) in combination with nut (217A) and washer (213A). Each stringer (216) runs through a selected bore hole (215) and is fixed in place at the cylindrical support (212). The free or opposite end of each stringer (216) extends through a selected transverse bore hole (215) of the second cylindrical support (214) so as to place the second cylindrical support (214) in a position parallel to the first cylindrical support (212) on the stringers (216).

Figure 12:
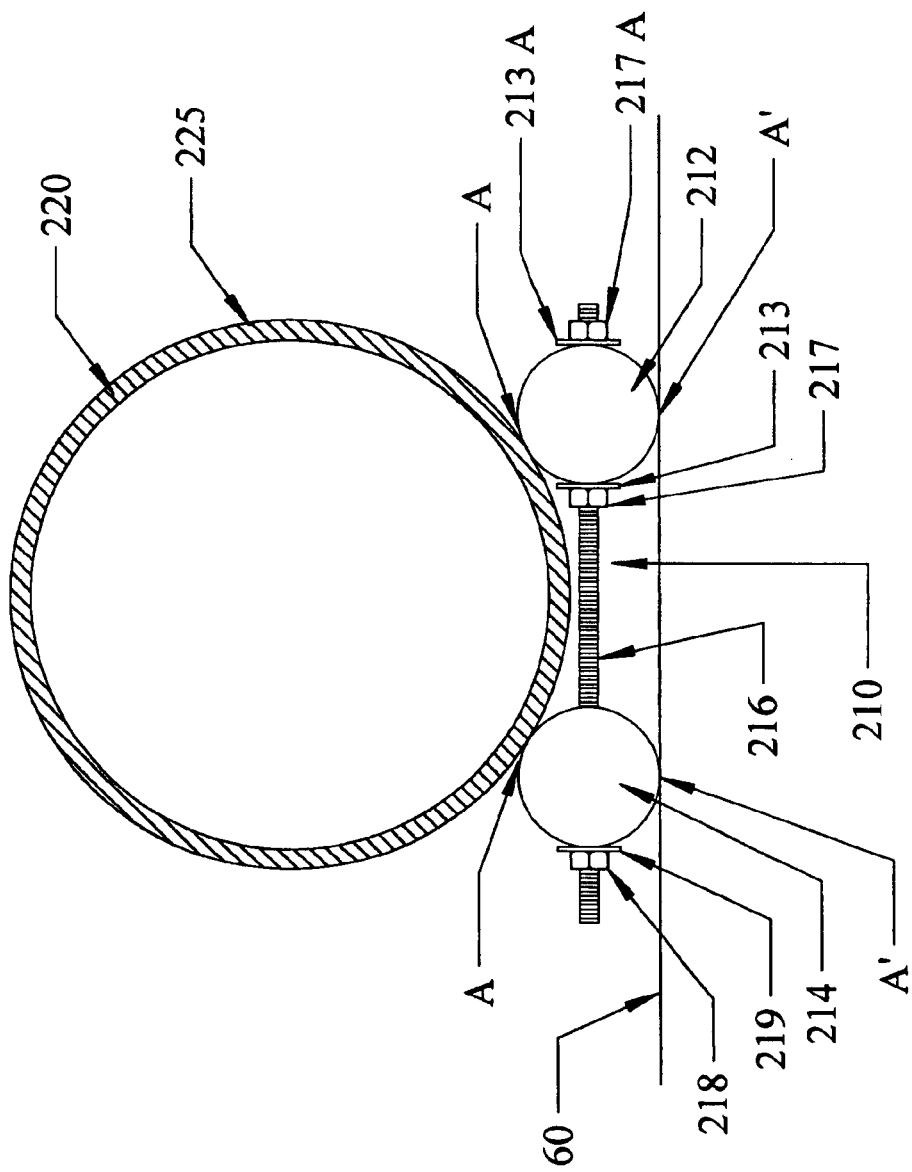
FIG. 12 is an end view of the pipe support of FIG. 11 shown in position under a pipeline.

As shown in FIG. 12, an end view of the pipe support (210), a stringer nut (218) and washer (219) are threaded onto each stringer (216) to secure the second cylindrical support onto the stringers (216). The nuts (218) and washers (219) are threadably movable along the stringer (216) and may be manipulated solely from the outside longitudinal side of the pipeline (220). The nuts (218) and washers (219) allow the second cylindrical support (214) to be slideably positioned at a desired location with respect to the first cylindrical support (212).

Figure 13:
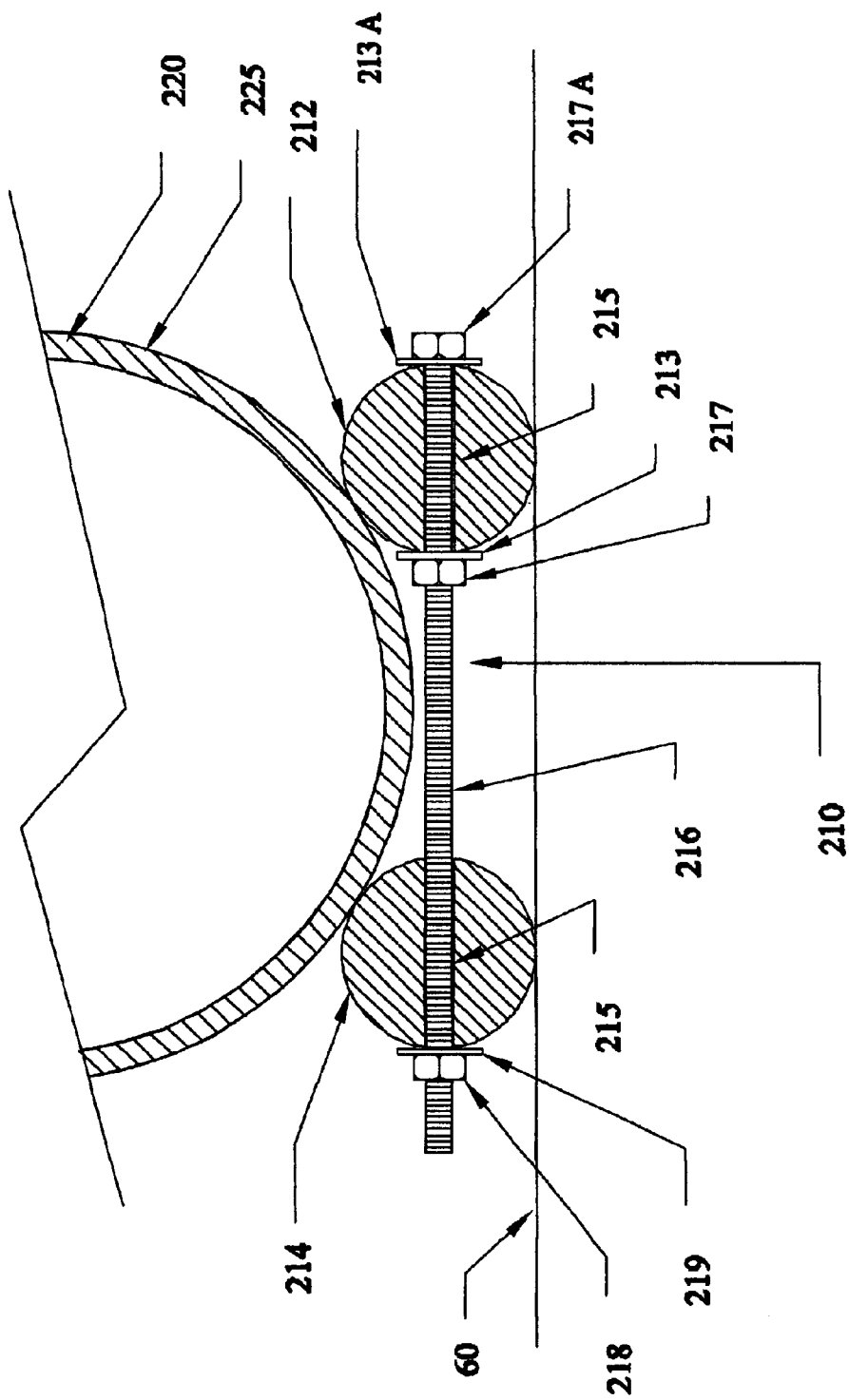
FIG. 13 is a longitudinal cross-sectional view of the pipe support of FIG. 11 cut through the stringer bore hole of each support cylinder.

FIG. 13, a longitudinal cross-sectional view of the pipe support (210) cut through the stringer bore hole (215) of each support cylindrical support (212, 214), shows a stringer (216) fixedly mounted in a bore hole (215) of the first cylindrical support (212) by means of the combination of nut (217) and washer (213) and nut (217A) and washer (213A). The combination of nuts and washers fixedly mount the end of the threaded stringer (216) to the first cylindrical support (212).

As in the initial embodiment set fourth herein, the cylindrical shape of the supports (112, 114, 212, 214) serves to reduce the contact surface area interface point (A) between the supports (112, 114, 212, 214), the outer surface (125, 225) of the pipeline (120, 220) and the contact surface area interface point (A) between the supports (112, 114, 212, 214) and the support pad (60). This reduction of contact surface area helps to reduce the incidence of corrosion and the collection of debris at the pipeline—pipe support interface.

As noted above, the cylindrical supports (112, 114, 212, 214) may be formed from synthetic materials, or a combination of such materials, such as virgin resins, polyolefins and plastics, as well as other elastomers to guard against corrosion. However, these cylindrical supports (112, 114, 212, 214) may also be formed from cast metals or metal alloys such as stainless steel without departing from the scope of applicants' invention.

The embodiments of the pipe support of applicants' invention described herein are intended to be illustrative but not limiting and variations of the invention and changes may be made without departing from the spirit and scope of the invention as defined in the following claims.

We claim:

1. A pipe support comprising:
   (a) a first longitudinally extending cylindrical support,
   (b) a plurality of transversely extending rods, each of said rods having first and second ends, positioned at desired locations along the longitudinal axis of said first cylindrical support;
   (c) means for fixing said first end of each of said rods to said first cylindrical support;
   (d) a second longitudinally extending cylindrical support slideably positioned onto each of said rods so as to place said second cylindrical support parallel to said first cylindrical support, said second cylindrical support having an outside longitudinal side and an inside longitudinal side; and
   (e) means for adjustably moving the position of said second cylindrical support transversely with respect to said first cylindrical support to selected desired positions along said plurality of rods solely from said outside longitudinal side of said second cylindrical support.

2. The pipe support of claim 1, wherein said means for adjustably moving said second cylindrical support transversely with respect to said first cylindrical support includes threads cut onto each of said transversely extending rods and a threaded nut positioned on each of said rods against said second cylindrical support whereby the movement of each said nut will position said second cylindrical support at desired position.

3. A pipe support comprising:
   (a) a first longitudinally extending cylindrical support, said first cylindrical support having a plurality of recessed cavities positioned at desired locations along the longitudinal axis of said first cylindrical support;
   (b) a plurality of transversely threaded extending rods, each of said rods having first and second ends, positioned at said desired locations along the longitudinal axis of said first cylindrical support, said first end of each of said rods having a bolt head corresponding to the shape of said recessed cavities of said first cylindrical support and a nut for holding said first cylindrical support against said bolt head of each of said rods;
   (c) a second longitudinally extending cylindrical support slideably positioned onto each of said rods so as to place said second cylindrical support parallel to said first cylindrical support, said cylindrical support having an outside longitudinal side and an inside longitudinal side; and
   (d) a threaded nut positioned on each of said rods from said end of said rods and against said second cylindrical support for adjustably moving the position of said second cylindrical support transversely with respect to said first cylindrical support to selected desired positions along said plurality of rods solely from said outside longitudinal side of said second cylindrical support.

4. The pipe support of claim 3 wherein said first and second cylindrical supports are made of synthetic composite materials.

5. The pipe support of claim 4 further comprising a wrench having an elongated socket for turning said nuts.

6. A pipeline support comprising:
   (a) a first longitudinally extending substantially cylindrical support, said first support having a plurality of transverse bore holes extending through said first support, each said bore hole having a first end, a second end and a peripheral edge, each said bore hole being positioned at desired locations along the longitudinal axis of said first cylindrical support, said first support having a recessed area around said peripheral edge of each of said bore holes at said first end of each of said bore holes;

(b) a transversely extending threaded rod, extending outward from said second end of each of said holes of said first cylindrical support, each of said threaded rods having a bolt head positioned in said recessed area around said peripheral edge at said first end of each of said bore holes, said bolt head conforming to the shape of said recessed area whereby said bolt head is prohibited from turning;

(c) a second longitudinally extending substantially cylindrical support conforming to the shape of said first cylindrical support, said second longitudinally extending support having an inside longitudinal side and an outside longitudinal side, said second cylindrical support having a plurality of transverse bore holes extending through said second cylindrical support at a position corresponding to said bore holes in said first cylindrical support, said second cylindrical support being slideably positionable along each of said threaded rods by means of said bore holes so as to place said second cylindrical support in a position parallel to said first cylindrical support; and (d) a nut and washer combination threadably mounted to each of said threaded rods at the outside longitudinal side of said second cylindrical support for adjustably moving said second cylindrical support toward and away from said first cylindrical support to selected desired positions along said threaded rods.

7. The pipe support of claim 6 wherein said first and second cylindrical supports are made of a composite of synthetic materials.

8. The pipe support of claim 7 further comprising a removable wrench having an elongated socket for turning said nuts.

9. In a piping system comprising a longitudinally extending pipeline and pipe supports, an improved pipe support:

(a) first and second longitudinally extending cylinders, each said cylinder having an outer peripheral surface for supporting a pipeline along its longitudinal axis between said first and second cylinders along said outer peripheral surface of said first and second cylinders, said first and second cylinders each having an inside longitudinal side and an outside longitudinal side;

(b) a plurality of transversely extending rods, each of said rods having first and second ends, positioned at desired locations along the longitudinal axis of said first cylinder;

(c) means for fixing said first end of each of said rods to said first cylinder;

(d) means for slideably positioning said second cylinder along each of said rods adjacent to said first cylinder; and (e) means for adjustably moving said second cylinder from said outside longitudinal side of said second cylinder toward and away from said first cylinder to selected desired positions along said plurality of rods whereby the point of support of said pipeline along said outer peripheral surface of said first and second cylinders may be changed.

10. The pipe support of claim 9, wherein said means for adjustably moving said second cylinder toward and away from said first cylinder includes threads cut onto each of said transversely extending rods and a threaded nut and washer combination positioned on each of said rods against said second cylinder along its outside longitudinal side whereby the movement of each said nut will position said second cylinder at a desired position.

11. The pipe support of claim 10, wherein said means for fixing said rods to said first cylinder includes:

(a) providing said first cylinder with a plurality of cavities recessed from the surface of said first cylinder;

(b) a bolt head fixed to each of said rods, said bolt head corresponding to the shape of cavities so as to prevent said bolt head from turning; and (c) a nut threadably mounted to each of said rods holding said first cylinder against said bolt head of each of said rods.

12. The pipe support of claim 11 wherein said first and second cylinders are made of a composite of synthetic materials.

13. The pipe support of claim 12 wherein, wherein said means for adjustably moving said second cylinder toward and away from said first cylinder is further comprised of a wrench having an elongated socket for turning said nuts.

\* \* \* \* \*